(12) United States Patent
Gleeson

(10) Patent No.: US 7,475,559 B2
(45) Date of Patent: Jan. 13, 2009

(54) ELECTRONIC VEHICLE CLIMATE CONTROL SYSTEM WITH HIGHLY INTEGRATED MULTI-FUNCTION SWITCHES

(75) Inventor: Edward J. Gleeson, Red Lion, PA (US)

(73) Assignee: Trans/Air Manufacturing Corp., Dallastown, PA (US)

( * ) Notice: Subject to any disclaimer, the term of this patent is extended or adjusted under 35 U.S.C. 154(b) by 706 days.

(21) Appl. No.: 11/197,369

(22) Filed: Aug. 5, 2005

(65) Prior Publication Data

US 2007/0028635 A1    Feb. 8, 2007

(51) Int. Cl.
  *B60H 1/32* (2006.01)
  *B60L 1/00* (2006.01)
  *H04B 1/08* (2006.01)

(52) U.S. Cl. .......................... 62/244; 62/239; 307/10.1; 455/349

(58) Field of Classification Search .................. 62/239, 62/244; 307/10.1; 455/349, 347; 701/1, 701/36; 200/5 R
See application file for complete search history.

(56) References Cited

U.S. PATENT DOCUMENTS 6,032,089 A * 2/2000 Buckley .................... 701/36

6,093,977 A * 7/2000 Fujita et al. ................ 307/10.1

OTHER PUBLICATIONS

Picture of Trans/Air EC2 Thermostat Control.
Picture of Trans/Air "Climate Control" Thermostat Control.
Picture of Thermo King "Clima Aire" Thermostat Control.
Picture of Carrier "Transicold" Thermostat Control.

* cited by examiner

*Primary Examiner*—Chen-Wen Jiang
(74) *Attorney, Agent, or Firm*—Jacobson Holman PLLC

(57) ABSTRACT

An electronic climate control system is provided for controlling an HVAC system on a bus or other high-occupancy vehicle either as a stand-alone system or for retrofitting with existing HVAC equipment. The system includes a system control unit having output terminals connected to the vehicle compressor, condenser and evaporator units for control thereof, as well as a user control unit electrically coupled to the system control unit for receiving user inputs. The user control unit includes one or two switches, each sized to fit with an adaptable housing into standard rocker switch blanks of varying sizes in a bus control panel. These highly integrated switches, which are programmable and can support system control units of varying complexity, are easy to install and use, and provide multi-function capability including dynamic temperature and diagnostic outputs.

21 Claims, 10 Drawing Sheets

| | |
|---|---|
| 110y | RETURN AIR TEMP |
| 110x | SETPOINT TEMP |
| 110e | FUSE |
| 110a | HIGH PRESSURE |
| 110b | LOW PRESSURE |
| 110c | FREEZESTAT |
| 110d | COMPRESSOR |

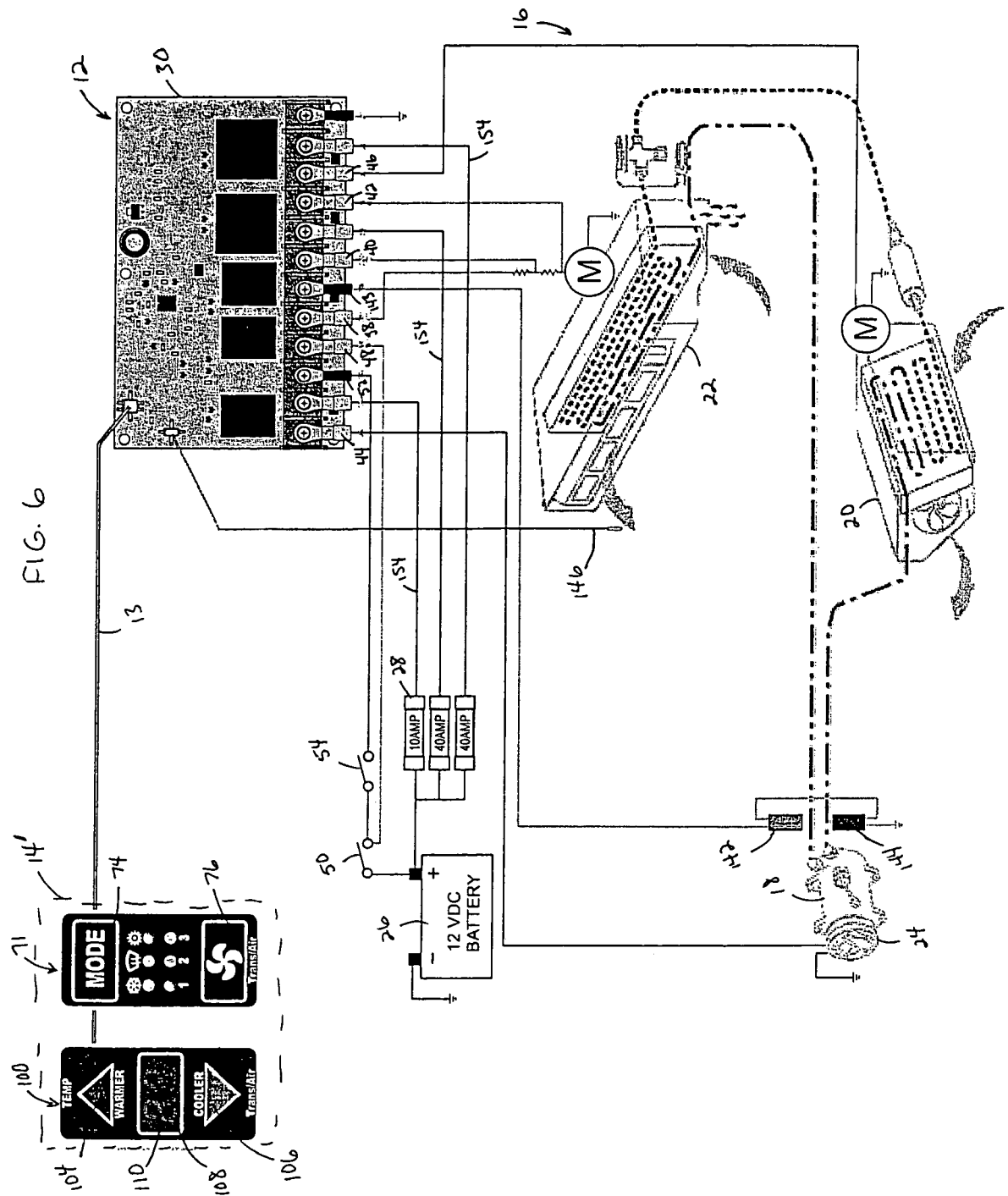

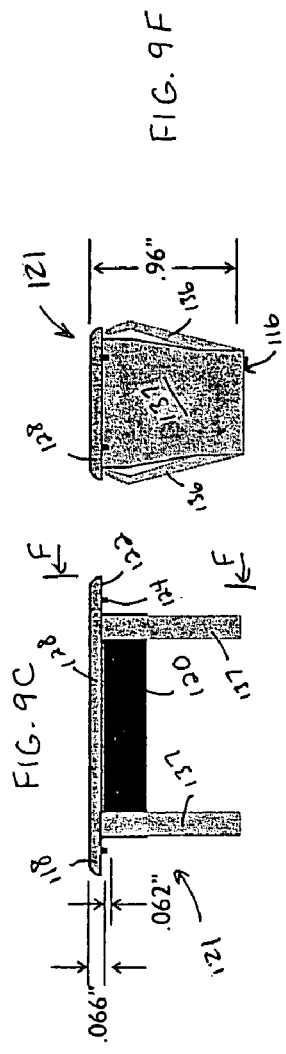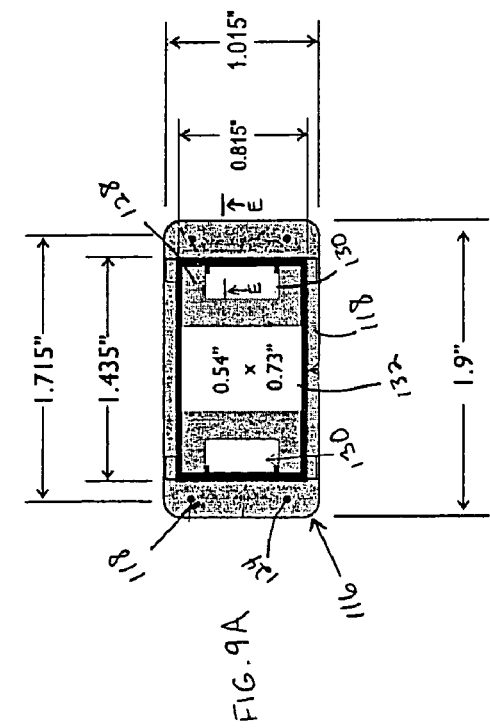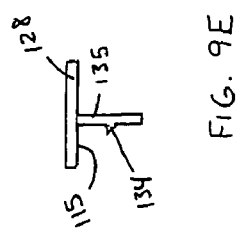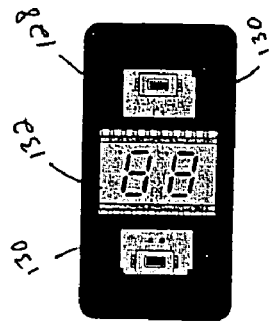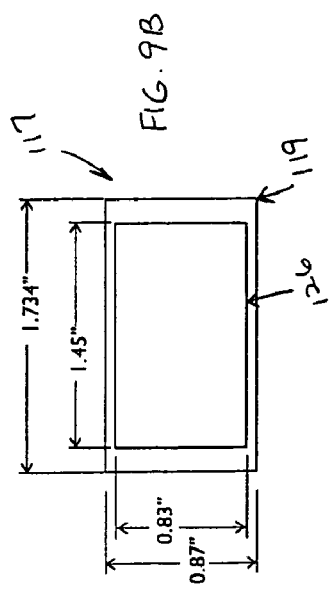

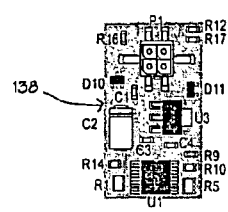
FIG. 10
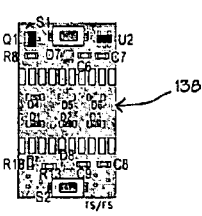
FIG. 11
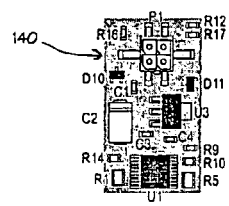
FIG. 12
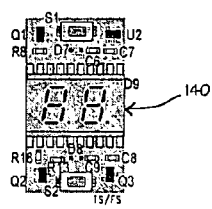
FIG. 13
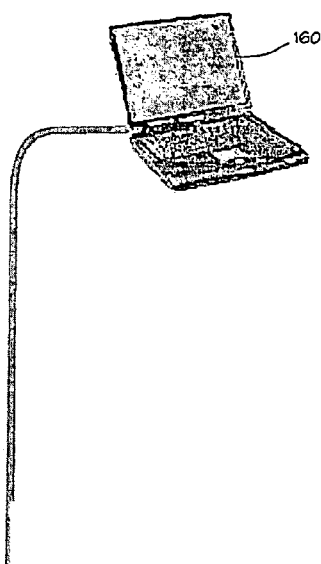
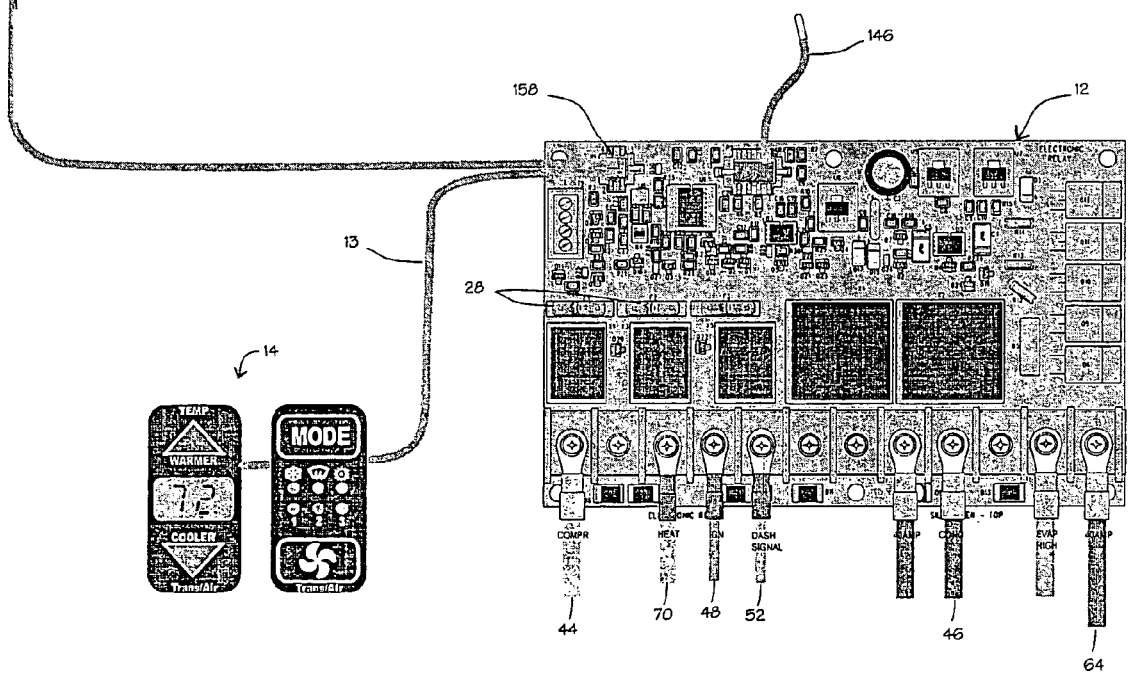
FIG. 15

ELECTRONIC VEHICLE CLIMATE CONTROL SYSTEM WITH HIGHLY INTEGRATED MULTI-FUNCTION SWITCHES

BACKGROUND OF THE INVENTION

1. Field of the Invention

The present invention is related to the field of HVAC systems for vehicles, especially school and commercial buses and the like and, more particularly, to an electronic climate control system with multi-function switches for such vehicles.

2. Description of the Related Art

High-occupancy passenger vehicles such as school buses and commercial buses have a dashboard area that includes a large number of switches and controls for adjusting the activation and operation of various heating, cooling, and lighting systems, among others. To accommodate these various switches, buses are typically manufactured to include a dashboard panel and/or adjacent control panel having a plurality of switch blanks or cutouts therein. These switch blanks are generally of the same approximate size such that they may be used interchangeably to mount various types of rocker-style switches. The rocker switches are also constructed to be of a standard, generally uniform size. By standardizing the switch blanks and the rocker switches, the location of specific switches within the overall control panel may be varied according to the needs of a particular bus or driver, since any of the most commonly used switches will fit into any of the common switch blanks.

Rocker switches of the type just summarized generally have only two positions, i.e., the switch is either turned on or off, as with a standard light switch. On a bus, these switches are suitable for controlling the on and off operation of various lights, fans, etc., as necessary. However, more complex systems such as the climate control system require a wider range of adjustments involving a greater number of parameters.

To provide the necessary range of control functions, conventional HVAC systems on buses have a set of controls presented to the driver through a faceplate that is considerably larger than the standard rocker switch blank. As a result, it is necessary to make a large customized cutout in the dashboard panel to accommodate the HVAC control unit. This complicates installation of the HVAC control unit as the location of the cutout must be properly determined and then the actual cutout made using the necessary tools. The skill of the installer is important as errors in placement and installation of the control unit faceplate can be costly and unsightly. In addition, the large panel that is cut out takes up a lot of space which, given the limited area available on the dashboard and adjacent panels, reduces the number of locations remaining for other controls and increases the visual complexity of the dashboard area for the driver.

Therefore, a need exists for an HVAC system having a control interface that takes up less space on the bus control panel while at the same time providing a wide range of control adjustment capability.

SUMMARY OF THE INVENTION

The foregoing deficiencies in existing systems are addressed by the present invention which provides an electronic climate control system for controlling an HVAC system on a bus or other vehicle. The electronic climate control system includes a system control unit, such as a relay board, and a user control unit having a mode/fan speed switch. The system also preferably includes a plurality of sensors that provide inputs to the system control unit or relay board.

The user control unit is electrically coupled to the system control unit, with the mode/fan speed switch being sized to fit in a standard rocker switch blank within a control panel of the bus. Such a standard switch blank is generally a cutout having dimensions on the order of one inch by two inches.

The mode/fan speed switch employs an interface panel which includes a touch pad having a mode input surface and an activation level input surface. The interface panel also includes a plurality of indicators for displaying the selected mode and activation level which are initiated through respective pressure contact with the two input surfaces. The selected mode and activation level as input by the user are transmitted to the system control unit which, in turn, initiates appropriate activation of the HVAC system. The system control unit or relay board acts in response to the user control inputs as well as to various sensed conditions as monitored by the plurality of sensors.

The user control unit of the present invention may be expanded to include a thermostat switch, also sized to fit in a standard rocker switch blank. In this case, the user control unit occupies two standard rocker switch blanks.

The thermostat switch of the expanded user control unit has an interface panel for receiving temperature selection input from the user, who is typically the driver. The temperature input interface panel includes a display and a second touch pad having two input surfaces for respectively incrementing and decrementing a desired set temperature which is shown on the display. Once the desired set temperature has been entered, the display variably displays the set temperature or the inside temperature of the bus as sensed by one of the plurality of sensors. Other conditions monitored by the plurality of sensors are also displayed, as they arise and as appropriate.

The system control unit may be variously embodied, but generally there are two types of system control units: the basic relay board and the enhanced relay board.

The basic relay board can operate with the user control unit that has only the mode/fan speed switch, or with the expanded user control unit having two switches, and includes terminals for controlling the electronic climate control system evaporator, compressor and condenser. The basic relay board can also be modified to receive various sensor signal inputs relating to system safety and, when used with the expanded user control unit, to detect and display temperature information.

The enhanced relay board also includes terminals for controlling the electronic climate control system evaporator, compressor and condenser, while adding an automatic climate temperature control mode through circuitry for an infinitely variable evaporator fan speed control. The enhanced board is also programmed to receive and process a wider range of signal inputs and to provide diagnostic information relating to system operation, both dynamically during bus operation and during maintenance operations. Accordingly, the enhanced relay board requires the expanded user control unit in order to control the automatic mode of the evaporator fan, including temperature setting, and to display the various diagnostic code information.

As noted, the user control unit occupies either one standard rocker switch blank or two such blanks, depending upon whether just the mode/fan speed switch is used or the mode/fan speed switch in combination with the thermostat switch is used. The size of the switch blanks in the bus dashboards of different manufacturers can vary as much as a quarter-inch in either direction. To accommodate these variations, each of the mode/fan speed switch and the thermostat switch are fitted within an adjustable housing as a switch module. The housing allows the switch to be snapped into its respective switch blank while appearing substantially flush with the dashboard, and holds the switch in place once snapped therein.

The adjustable housing includes a faceplate to which the body of the switches is secured. The faceplate has outwardly extending flanges designed as breakaway tabs which, when intact, enable the switch module to fit snugly within a larger switch blank and, when removed, enable the switch module to fit within a smaller switch blank. Flexible retaining clips on each side of the housing provide the snap-in mounting functionality.

It is, therefore, one object of the present invention to overcome the difficulties of installing large and non-typically sized HVAC control units into a bus dashboard panel.

Another object of the present invention is to provide a user control unit having a smart electronic switch that provides multi-function capability while fitting into a standard switch blank.

A further object of the present invention is to provide an electronic climate control system for HVAC equipment having a user control unit that is easily installed, fitting into a standard switch blank, and which also readily allows for subsequent changes to be made in switch location as between any of a plurality of standard switch blank locations.

Yet another object of the present invention is to provide a multi-function smart switch that can be used to control relay boards of varying complexity.

A further object of the present invention is to provide a user control unit having one or two smart electronic switches, each of which is fitted in an adjustable housing for snap-in mounting into standard switch blanks of slightly varying size.

A still further object of the present invention is to provide an HVAC control input mechanism including a mode and fan speed switch that can be used alone or which can be augmented with a second switch having thermostat and diagnostic capability for increased HVAC control functionality.

Another object of the present invention is to provide an HVAC control system including an electronic switch coupled to a relay board that is equipped with a computer interface port for HVAC system monitoring and diagnostic purposes.

Yet another object of the present invention is to provide an HVAC control system that fits into the space of two standard rocker switch blanks and which includes dynamic diagnostic capability provided through a plurality of sensors and a thermostat switch with display for displaying various diagnostic codes correlating with the conditions detected by the sensors.

Still another object of the present invention is to provide an HVAC control system having an electronic switch that can be used to control a plurality of relay boards connected in series for multiple levels of climate control within a high occupancy vehicle such as a bus.

Another object of the present invention is to provide a housing having breakaway tabs for fitting of a switch into varying size openings and which will also lock the switch module in place in the opening when snapped in.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 6 illustrates an electronic climate control system having an expanded user control unit that includes the switches of FIGS. 4 and 5.

FIG. 9A is a view of a user control unit housing for each of the switch elements of FIGS. 4 and 5.

FIG. 9B illustrates the minimum and maximum switch blank cutout dimensions accommodated by the housing of FIG. 9A.

FIG. 9C is a side elevation view of the housing of FIG. 9A coupled with a switch element to form a switch module.

FIG. 9D is a view of an interface panel mask overlying the switches of FIGS. 4 and 5.

FIG. 9E is a view taken along line E-E of FIG. 9A, illustrating a retaining clip used to secure the switch body to the housing faceplate.

FIG. 9F is a view along line F-F of FIG. 9C, showing a spring arm mechanism for securing the housing of FIG. 9A within a switch blank.

FIG. 10 is a component view of the back side of a printed circuit board for the mode/fan speed switch of FIGS. 1, 4, 6 and 8.

FIG. 11 is a component view of the front side of the printed circuit board of FIG. 10.

FIG. 12 is a component view of the back side of a printed circuit board for the thermostat switch of FIGS. 5, 6 and 8.

FIG. 13 is a component view of the front side of the printed circuit board of FIG. 12.

FIG. 15 is an illustration of the computer diagnostic capability of the electronic climate control system of FIG. 6.

DETAILED DESCRIPTION OF THE PREFERRED EMBODIMENTS

Figure 1:
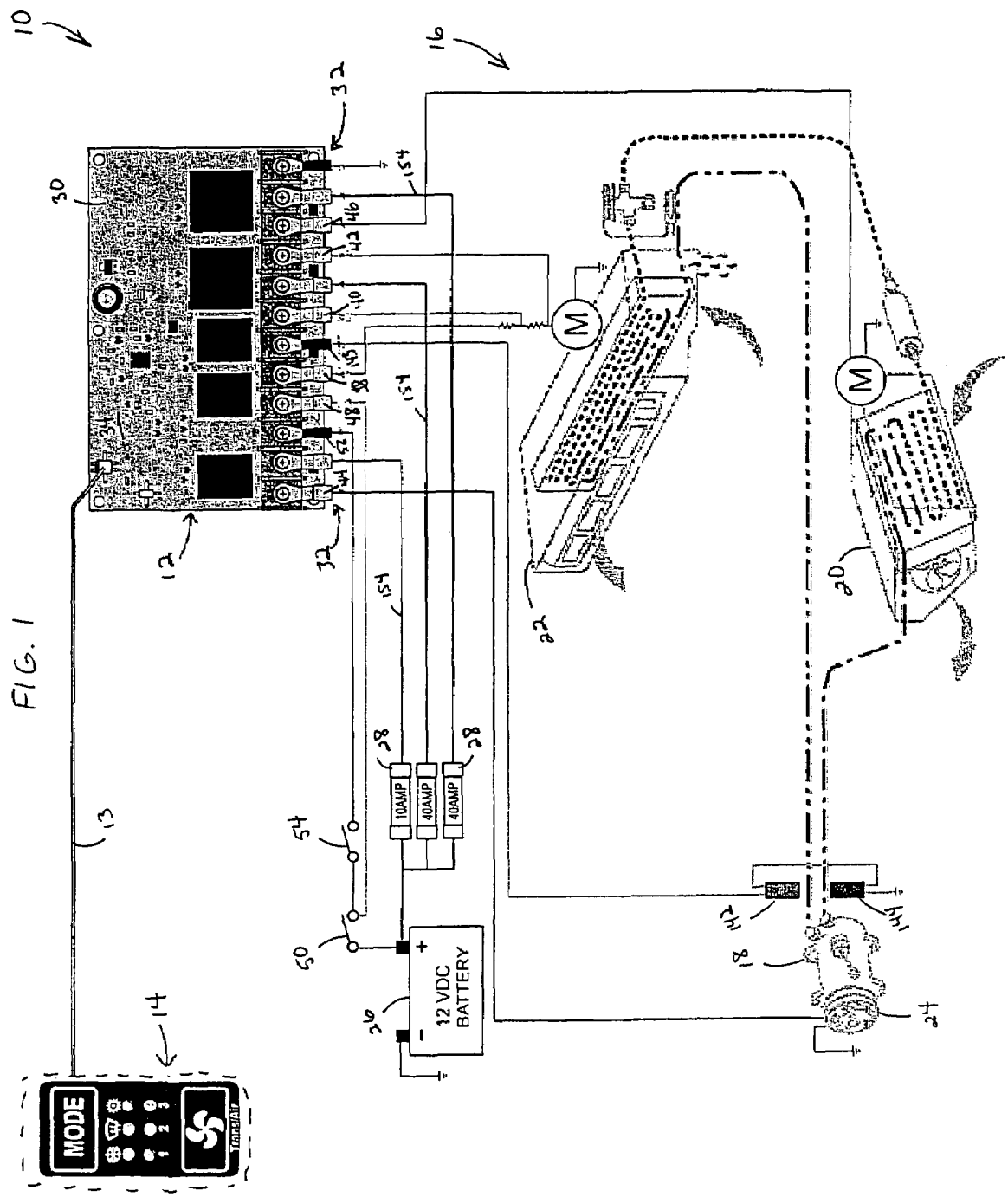
FIG. 1 illustrates the components of an overall electronic climate control system in accordance with the present invention.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

As representatively depicted in FIG. 1, the present invention is directed to an electronic climate control system, generally designated by the reference numeral 10. The electronic climate control system 10 has a system control unit, generally designated by the reference numeral 12, and a user control unit, generally designated by the reference numeral 14. The user control unit 14 communicates with the system control unit 12 over connection 13.

The electronic climate control (ECC) system controls an HVAC system, generally designated by the reference numeral 16, typically installed in a bus or other high-occupancy vehicle. The HVAC system 16, as is conventionally known, includes a compressor 18, a condenser 20 with motor M, and an evaporator 22 with motor M, with the compressor 18 being cycled on and off by a compressor clutch 24. A power source such as 12-volt battery 26 provides power to the ECC system, with various fuses 28 being inserted within the circuit to protect components of the ECC system 10.

The ECC system may be installed as a stand-alone system on an existing vehicle that does not have an air conditioning system, in which case the condenser, compressor, evaporator, system control unit and user control unit would all be installed as an integrated system. The ECC system can also be added to augment an existing vehicle air conditioning system in which case variable integration with the OEM equipment is possible depending upon the vehicle's sophistication and the complexity of the system control unit, i.e., whether the system control unit is a basic relay board or an enhanced relay board, as will be more fully discussed hereafter.

The system control unit 12 is programmable and is in the form of a relay board 30 having a plurality of power connections and a plurality of signal connections, generally designated by the reference numeral 32. The complexity of the relay board 30 may be varied through the incorporation of different components, terminal connections, and appropriate programming. The relay board 30 shown in FIG. 1 is referred to herein as a basic relay board 34, and is shown schematically in FIG. 2. This schematic is provided as a representative example only, as other circuit constructions could also be used to achieve the same functions as would be known by persons of ordinary skill in the art.

Figure 2:
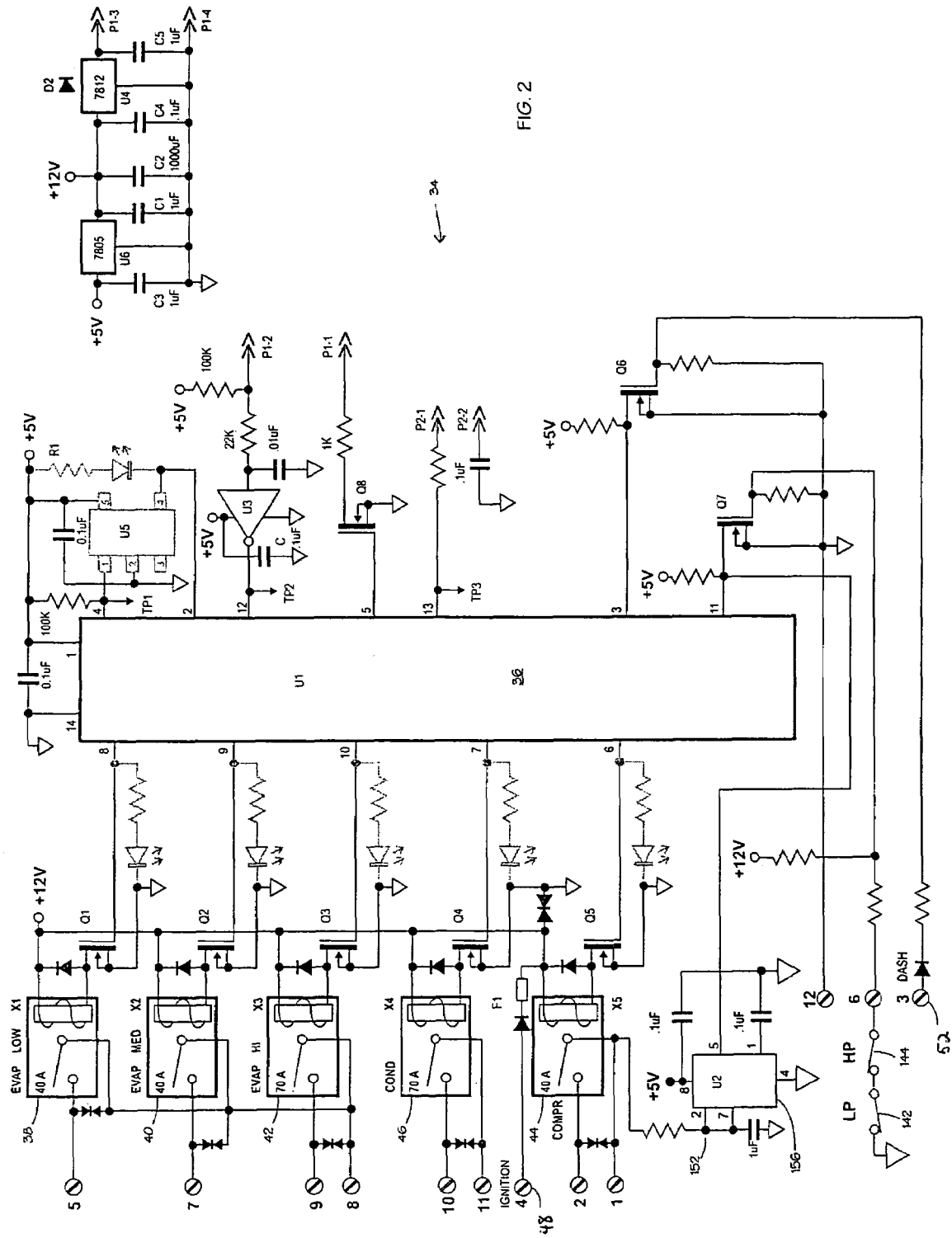
FIG. 2 is a circuit drawing of a first embodiment of a system control unit as included in the electronic climate control system of FIG. 1.

As shown in FIG. 2, the basic relay board 34 includes a microprocessor 36 coupled to five terminals, namely evaporator low 38, evaporator medium 40, evaporator high 42, compressor 44 and condenser 46. The three evaporator terminals are connected to the evaporator 22 and control the evaporator fan 22 with low, medium and high fan speed inputs. The compressor 44 and condenser 46 terminals are coupled to the compressor 18 and condenser 20, respectively. The basic relay board 34 also includes an ignition switch input 48 coupled to the vehicle ignition switch 50 for determining when the ignition is on, and a dashboard signal switch input 52 coupled to a dashboard switch 54 for determining whether a user input has been received relating to a climate control selection.

Figure 3:
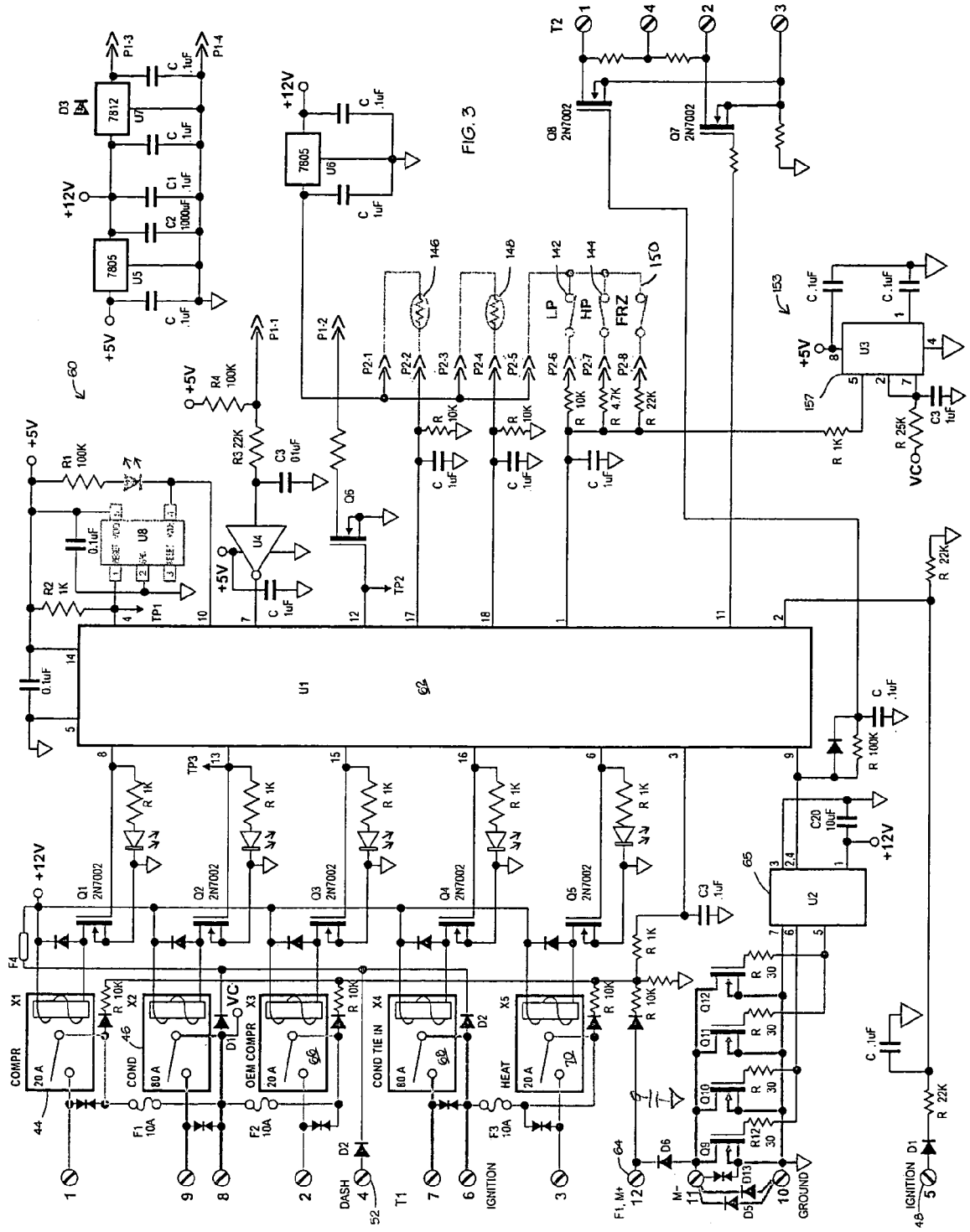
FIG. 3 is a circuit drawing of a second embodiment of a system control unit as included in the electronic climate control system of FIG. 1.

A more complex relay board, referred to herein as the electronic or enhanced relay board and generally designated by the reference numeral 60, is set forth in FIG. 3. As shown, the enhanced relay board 60 also includes a microprocessor 62 having compressor and condenser output terminals as well as dashboard and ignition inputs. However, the enhanced relay board 60 has considerably expanded functionality, including an infinitely variable evaporator fan speed output terminal 64 as well as an OEM compressor terminal 66, a condenser tie-in terminal 68 and a heating terminal 70.

The infinitely variable evaporator fan speed control 64 operates in conjunction with a microprocessor 65 to provide an automatic climate temperature control mode capability. In the automatic climate temperature control mode, the system control unit controls the cycling of the compressor to maintain a desired temperature. Operation of the automatic climate temperature control mode may be fully automatic in which case the system control unit controls activation of the compressor and also self-adjusts the speed of the evaporator fan through control 64. Alternatively, the automatic climate temperature control mode may be operated with manual fan speed selection in which case the system control unit continues to cycle the compressor on and off as in fully automatic operation, but the user manually selects the desired fan speed.

The OEM compressor terminal 66 is used when the host vehicle for installing the ECC system already has an air conditioning system, and allows the existing OEM compressor to be wired into the system control unit 12. By connecting the OEM compressor to the enhanced relay board 60 via the OEM compressor terminal 66, the ECC system 10, when installed on a vehicle already having a factory-installed air conditioning system, can be integrated with that OEM system so as to provide a unitary control interface for both the OEM compressor and the compressor unit 18 added by the ECC system 10. With the basic relay board 34 which does not have a terminal for connecting any existing vehicle compressor, such OEM compressor will remain separately controlled by the original vehicle air conditioning system, while the ECC system 10 is controlled using the user control unit 14.

Similarly, the condenser tie-in terminal 68 is used when adding the ECC system 10 to a vehicle already equipped with an air conditioning system. In such a system, the existing OEM condenser is removed and a condenser that is controlled by the ECC system is added and coupled to the tie-in condenser terminal 68. Since the added condenser is not inherently controllable by the OEM A/C control system on the vehicle, activation of the OEM A/C system using OEM vehicle controls, without activating the ECC system, would result in no activation of the condenser (the OEM condenser having been removed). To remedy this situation and ensure that the condenser is activated by either turning on the ECC system or turning on the OEM A/C controls, the input from the OEM A/C controls is connected to the ECC system control unit through the dash input terminal 52. Thus, turning on the existing A/C controls, even without turning on the ECC system, nonetheless activates the ECC system tie-in condenser 68 and the OEM compressor 66.

The ECC system as installed in a given vehicle may or may not include a heater component, depending upon the needs of the particular vehicle installation. When supplemental heat, i.e., heat beyond that provided by the OEM heater components, is needed, the ECC system as installed includes an additional water valve which is tied into the vehicle heating lines to expand the heating capacity of the existing OEM system. This valve is then coupled to the heating terminal 70 and controlled by the system control unit 12.

Figure 4:
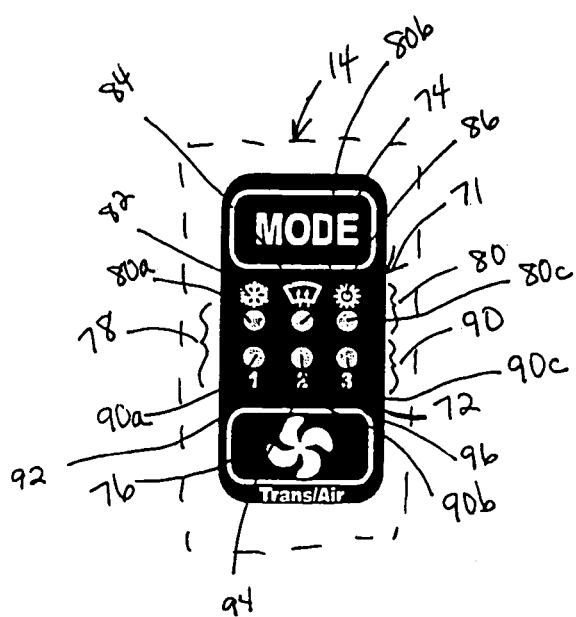
FIG. 4 depicts a mode/fan speed interface panel of the mode/fan speed switch of the user control unit of FIG. 1.

The user control unit 14, shown particularly in FIG. 4, includes a mode/fan speed switch generally designated by the reference numeral 71, having an interface panel 72 with touch pad surfaces including a mode input surface 74 and an activation level input surface 76. The mode input surface 74 is herein shown as being labeled with the word "MODE" but this surface may be designated by any symbol or conglomeration of symbols. The activation level, which generally corresponds with fan speed, is identified or labeled on the activation level input surface 76 with a fan blade symbol.

Preferably positioned between the two input surfaces 74, 76 are a plurality of indicators generally designated by the reference numeral 78 with corresponding symbol identifiers. The indicators may be embodied as LEDs, and are generally arranged in two sets.

The first set of indicators, generally designated by the reference numeral 80, displays the mode which has been selected. In the preferred embodiment shown, the modes include cool mode 82, defrost mode 84 and heat mode 86, with each of these modes being identified using an appropriate symbol such as a snowflake, a defroster, and a sun, respectively. Adjacent each mode symbol is an LED 80 that lights up upon activation of the corresponding mode. All of the LEDs may be the same color but they are preferably of different colors, each appropriate for the mode. In a preferred embodiment, the LED 80$a$ for cool is green, the LED 80$b$ for defrost is yellow, and the LED 80$c$ for heat is red.

The second set of indicators, generally designated by the reference numeral 90, displays the currently selected fan activation level. As shown, there are first, second and third fan activation levels which generally correspond with increasing fan speed. When the user control unit is used with the basic relay board 34, the activation levels include three settings of low fan speed 92, medium fan speed 94 and high fan speed 96. With the enhanced relay board 60 operating in manual mode, the activation levels also correspond with low, medium and high fan speeds. However, when the enhanced relay board 60 is operating in fully automatic climate temperature control mode, the fan speed has infinite variability such that the three settings indicate a range of speeds around the low, medium and high ranges.

As with the mode indicators 80, each of the activation levels is identified with an appropriate symbol, here with the numbers "1", "2" and "3", for fan speeds of low, medium and high, respectively. Adjacent each fan speed symbol, i.e., the numbers "1", "2", and "3", is an LED 90$a$, 90$b$, and 90$c$ that respectively lights up upon activation of the corresponding speed. All of the LEDs may be the same color or the LEDs may be different colors.

Selection of the mode and activation levels is initiated through respective pressure contact with the two input surfaces 74, 76. In response to each individual pressure contact against a respective input surface, the corresponding LEDs 80, 90 are sequentially activated. Thus, to select a mode, the user presses the mode input surface 74 until the desired LED 80 is illuminated. The LED activation sequence is generally from left to right with respect to the fan speed interface panel of FIG. 4 such that, each time the mode input surface is pressed, the mode to the right of the currently active mode is activated. For example, if the mode input surface 74 is initially in the cool mode 82 with LED 80$a$ illuminated, pressing the mode input surface 74 once will activate defrost mode 84, and pressing the mode input surface a second time will activate the heat mode 86, with the corresponding sequential activation of LED 80$b$ and LED 80$c$, respectively. This sequence is repeated with additional pressing of the mode input surface 74 to continually cycle through the modes in an endless loop.

The fan speed is similarly selected, but this functionality also controls the of/off status of the ECC system such that the user presses the activation level input surface 76 denoted by the fan blade symbol until the desired LED is illuminated or until all of the fan speed LEDs are off. For example, if the LED activation sequence is from left to right with respect to the mode/fan speed interface panel of FIG. 4 and the activation level or fan speed input surface 76 is initially i an "off" configuration, pressing the fan speed input surface once will activate low speed 92, pressing the fan speed input surface twice will activate medium speed 94, and pressing the fan speed input surface three times will activate high speed 96, with the corresponding activation of LED 90$a$, LED 90$b$ and LED 90$c$, respectively. Pressing of the fan speed input surface 76 a fourth time returns the activation level selection to an "off" position in which no LEDs are illuminated.

Figure 5:
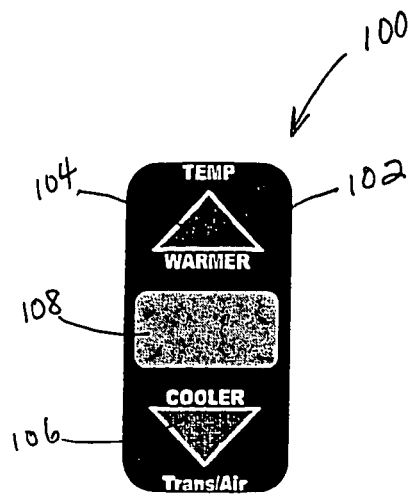
FIG. 5 depicts an interface panel of a thermostat switch as may be incorporated within an expanded user control unit according to the present invention.

The user control unit 14 may be expanded to include a thermostat switch, generally designated by the reference numeral 100, having a temperature input interface panel 102 as shown in FIG. 5. The temperature input interface panel 102 has touch pad surfaces including upper and lower input surfaces 104, 106 and a display 108 for displaying temperature and/or various diagnostic conditions. Incorporation of the expanded user control unit 14' within the ECC system is illustrated in FIG. 6.

When the user control unit 14, 14' is used in conjunction with a system control unit 12 having sufficient complexity, such as the enhanced relay board 60, the two input surfaces 104, 106 of the temperature input interface panel 102 are used to input a desired temperature which becomes the specified or "set" temperature. This set temperature is received as an input by the enhanced relay board 60 and is used to adjust the interior bus temperature when the system is operating in the automatic climate temperature control mode. As previously noted, when the automatic climate temperature control mode is fully automatic, the system control unit cycles the compressor and selects the fan speed, based on current temperature conditions relative to the set temperature. When operating in automatic climate temperature control mode with manual fan speed selection, however, the system control unit also cycles the compressor as appropriate given the return air and set temperatures, but adopts the user-selected fan speed.

Figure 7:
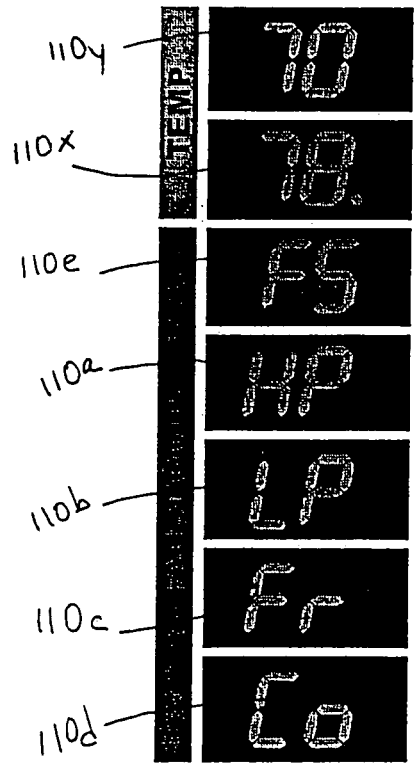
FIG. 7 shows representative display outputs of the thermostat switch of FIGS. 5 and 6.

The set temperature is selected through pressure contact with at least one of the two temperature input interface panel input surfaces 104, 106. The upper input surface 104, which is shaped as an increasing arrowhead, is pressed to increment or increase the set temperature a degree at a time. The lower input surface 106, which is shaped as an decreasing arrowhead, is pressed to reduce or decrement the set temperature a degree at a time. The display 108, which preferably displays two digits or letters, preferably indicates the currently established set temperature 110$x$ (see FIG. 7) as the upper and lower input surfaces are repeatedly pressed until the desired set temperature is displayed. Thereafter, the display 108 indicates the return air temperature 110$y$, which reflects the internal bus temperature, as the default display. The set temperature may be reviewed by pressing and holding the upper or lower input surface; upon release, the internal bus temperature will again be displayed.

The upper and lower input surfaces may be color-coded to better correlate with their functions. For example, the upper input surface 104 is preferably red to indicate an increase in warmth, while the lower input surface 106 is preferably blue or green to indicate an increase in coolness. This color-coding is optional, being unnecessary to underlying electrical function, but is suggested to increase the ergonomic function and styling of the switches.

The display 108 also indicates particular diagnostic conditions as detected by the ECC system 10 and discussed more fully hereinafter. Each of these conditions is preferably represented. by a predetermined two-letter code 110 that is suggestive of the underlying condition. Suggested codes 110 for various detected conditions or states are set forth in FIG. 7, each of which would individually appear in display 108 when appropriate. For example, if the diagnostic condition indicates a high pressure of the refrigerant, the code would be logically "HP" 110a appearing in display 108. Conversely if the diagnostic condition is one indicating a low pressure of the refrigerant, the code in display 108 would logically be "LP" 110b.

Figure 8:
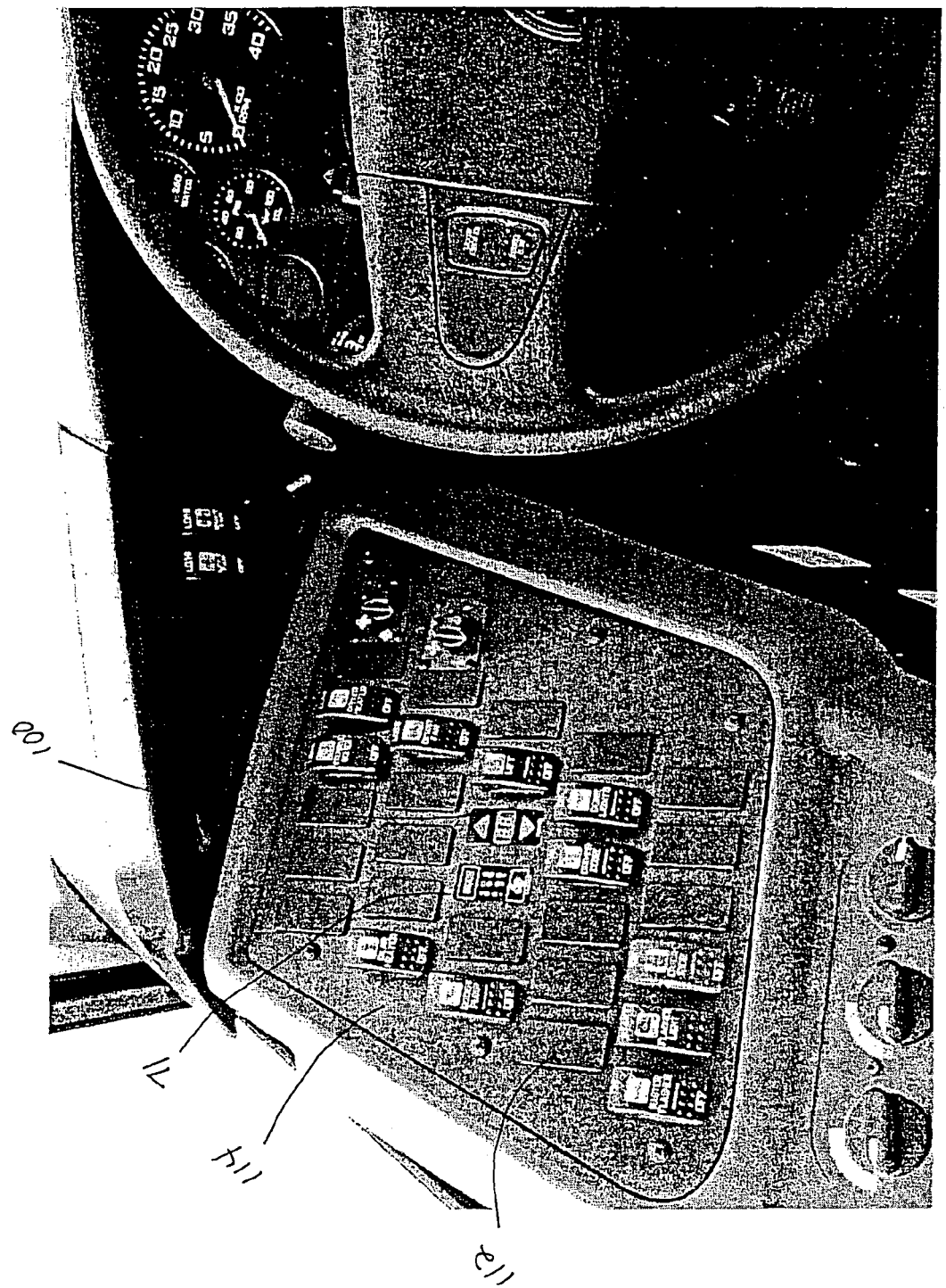
FIG. 8 shows a representative bus control panel having switch blanks with the user control unit of FIG. 6 mounted therein.

The mode/fan speed switch 71 and the thermostat switch 100 are each sized to fit in a standard rocker switch blank 112 within a control panel 114 of the bus. Such a standard switch blank 112 is generally a cutout having dimensions on the order of one inch by two inches. These switch blanks 112 are shown in a representative bus control panel 114 in FIG. 8, along with various installed switches including the mode/fan speed switch 71 and thermostat switch 100 of the user control unit 14' of the present invention.

To accommodate minor size variations in the switch blanks of a particular bus installation, the switches 71, 100 are each in a switch module which includes a plastic housing, generally designated by the reference numeral 116. The housing 116 includes breakaway portions or tabs 118 as shown in FIG. 9A. These tabs 118 enable the housing 116 to be adapted at the time of installation to fit within and cover a range of switch blank openings of slightly different sizes. For example, by retaining the tabs 118, the housing 116 can fit in a switch blank opening, generally designated by the reference numeral 117, having a maximum panel cutout 119 dimensioned at 1.734" by 0.87" as shown in FIG. 9B. However, because the switch body 120 is still shorter than the switch blank opening 117, the underside 122 of the tabs is provided with pins 124, best seen in FIG. 9C, that come into abutment with the edges of the switch blank opening 117 to prevent the switch body 120 from moving up and down within the opening. Conversely, if the tabs 118 are removed, the housing 116 can be as small as the minimum panel cutout area 126 of the switch blank opening 117 which, in this example, is 1.45" by 0.83". When the tabs have been broken off, which may be facilitated through the inclusion of "fold lines" or similar weakened areas (not shown) extending in alignment with the borders of the faceplate 128, the sides of the switch body 120 as installed are in abutment with the edges of the switch blank opening 117. This sizing adaptability further facilitates ease of installation as compared with the prior art systems. The housing 116 may be made of various materials but is preferably made of a plastic material having some flexibility, such as 94V0 nylon.

In any case, whether the tabs 118 are intact or removed, the faceplate 128 fits within the minimum panel cutout area 126, with the input surfaces 74, 76, 104, 106 being exposed through input surface apertures 130 in the faceplate 128, and the display 108 or indicator sets 80, 90 being exposed through a central aperture 132 in the faceplate 128, as shown in FIG. 9D. The switch body 120 is secured against the underside 115 of the housing faceplate 128 by retaining clips 134, as shown in FIG. 9E. Particularly, the switch body is brought toward the underside 115 of the faceplate until it encounters the sloped surface of the retaining clip. As pressure is applied by the switch body against the clip, the clip stem 135 flexes outwardly to an extent that allows the switch body to pass by the clip 134 and be secured thereby against the underside 115 of the faceplate 128.

The resulting switch module 121 including the switch body 120 and housing 116 is inserted into the switch blank opening 117. Spring arms 136 on side members 137 of the housing 116, depicted in FIG. 9F, flex inwardly as the switch module 121 is pushed into and through the switch blank opening 117. Once clear of the edges of the switch blank opening 117, these arms 136 spring back outwardly to secure the switch module 121 within the control panel 114.

The depth of the mode/fan speed switch and thermostat switch is also very small, being generally less than one inch as generally depicted in FIG. 9C. The small size of these highly integrated switches is achieved through printed circuit board (PCB) construction. Representative back and front views of the PCB of the mode/fan speed switch 71, generally designated by the reference numeral 138, are representively depicted in FIGS. 10 and 11, while representative back and front views of the PCB of the thermostat switch 100, generally designated by the reference numeral 140, are representively depicted in FIGS. 12 and 13, respectively. These PCBs correspond with the switch body 120 shown in FIGS. 9C and 9E.

Figure 14:
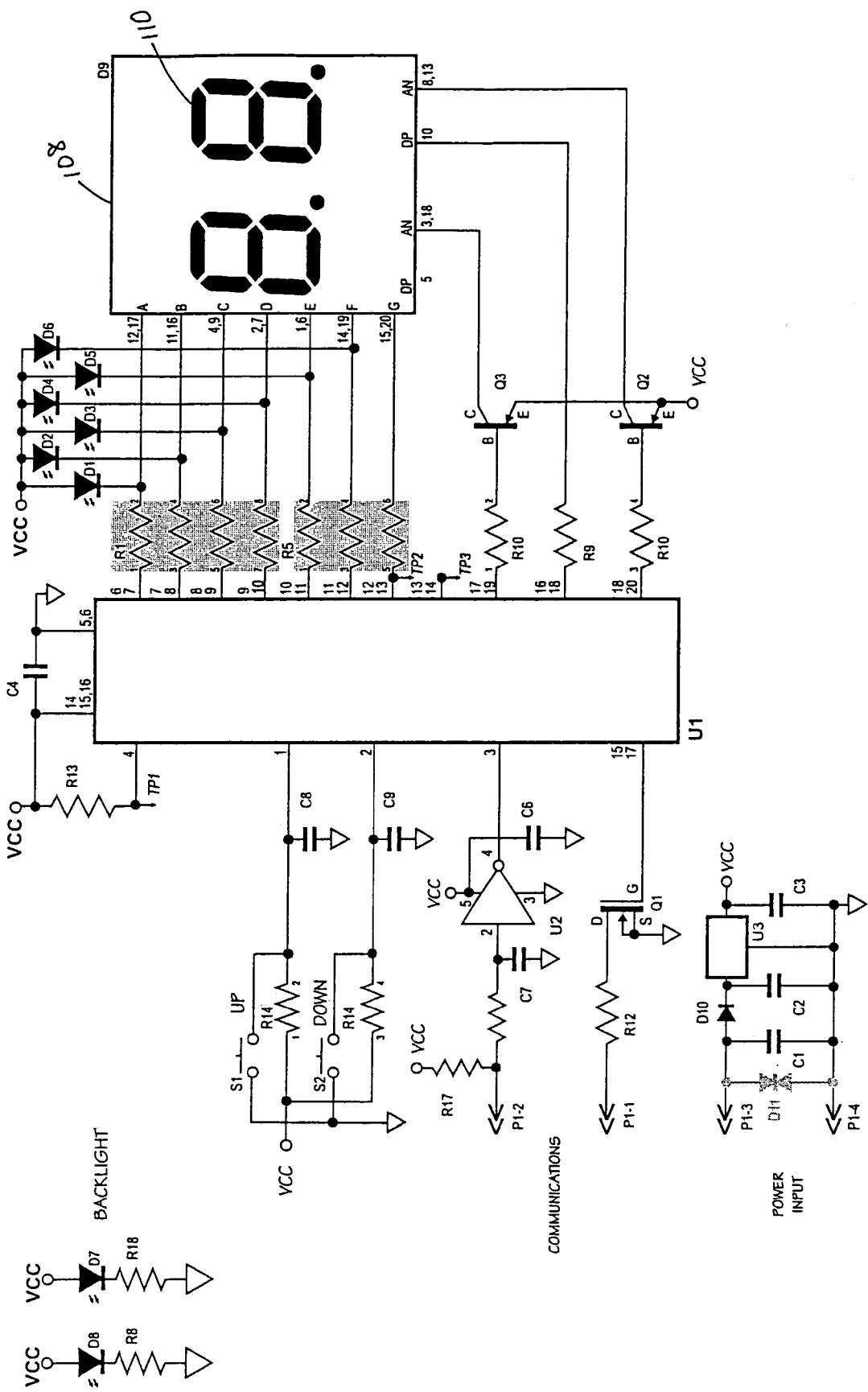
FIG. 14 is a circuit drawing of the circuitry for the mode/fan speed switch and thermostat switch of FIGS. 10-13.

A circuit drawing for the mode/fan speed and thermostat switches is provided in FIG. 14. As would be known by persons of skill in the art, the precise selection and configuration of the components on the PCBs may be varied while still obtaining comparable functionality.

The circuit of FIG. 14 contains all of the components necessary for both the mode/fan speed switch 71 and the thermostat switch 100, although neither of these switches individually uses all of the components. Specifically, the mode/fan speed switch uses LEDs D1-D6, which correspond with the two sets of indicators 80, 90, but does not use the two-digit display 108. Further, the mode/fan speed interface panel 72 is used as an overlay and coded instructions stored in a read-only memory on the PCB 138 are programmed for the fan switch 71.

The thermostat switch 100, on the other hand, uses the two-digit display 108 but does not use the LEDs D1-D6. Further, the thermostat switch interface panel 102 is used as an overlay and coded instructions stored in a read-only memory on the PCB 140 are programmed for the thermostat switch.

For both switches 71, 100, inputs from the input surfaces 74, 76, 104, 106 are input to the microprocessor U1 through S1 and S2, while communications with the relay board 30 are provided through P1-1 and P1-2, and power is provided through P1-3 and P1-4.

The ECC system 10 is preferably provided with a plurality of sensors, the number of sensors varying according to the complexity of the relay board. At a minimum, it is desirable to include a low pressure (LP) sensor switch 142 and a high pressure (HP) sensor switch 144, both of which are included in the basic relay board configuration as shown in FIGS. 1 and 2, and also in the enhanced relay board configuration shown in FIG. 3. The low and high pressure sensor switches are coupled to a safety signal input 143 to the system control unit.

The low pressure sensor detects low refrigerant pressure indicating that insufficient refrigerant remains in the system. When a low refrigerant pressure is detected with the enhanced relay board 60, the low pressure switch 142 is opened which causes the ECC system to turn off the compressor and condenser outputs of the system control unit 12, display "LP" 110b or other suitable code on the display 108 of the thermostat switch 100, set the fan speed to low, and disable the mode input surface 74 of the mode/fan speed switch 71 and the temperature setting input surfaces 104, 106 of the thermostat switch 100.

The high pressure sensor switch 144 detects high refrigerant pressure, as may occur in high temperature conditions or if the condenser is blocked so as to receive insufficient ventilation. When a high refrigerant pressure is detected with the enhanced relay board, the high pressure switch 144 is opened which causes the ECC system to turn off the compressor output of the system control unit 12, display "HP" 110*a* or other suitable code on the display 108 of the thermostat switch 100, set the fan speed to low, and disable the mode input surface 74 of the mode/fan speed switch 71 and the temperature setting input surfaces 104, 106 of the thermostat switch 100.

In the basic relay board 34 shown in FIG. 2, it can be seen that the low pressure and high pressure sensor switches 142, 144 are arranged in series. As a result, when either switch is opened, the ECC system shuts down as set forth above but the precise nature of the pressure difficulty, i.e., whether one of high or low pressure, is not directly indicated by the ECC system.

In order to provide an automatic climate temperature control mode, the ECC system 10 further includes a return air or internal temperature sensor 146 and, preferably, an external temperature sensor 148, as shown within the enhanced relay board 60 of FIG. 3 at P2-1 and P2-2, and at P2-3 and P2-4, respectively. With modification, an internal temperature sensor 146 can also be incorporated within the basic relay board 34 of FIG. 2, as shown by the corresponding inputs P2-1 and P2-2.

The internal temperature sensor or return air sensor 146 is used to monitor the temperature inside the bus and provide a sensor input to the system control unit 12 which, upon comparison of the return air temperature with the set temperature, initiates compressor clutch engagement and adjustment in the infinitely variable evaporator fan speed control, as appropriate. For example, in automatic climate temperature control mode with fully automatic operation, if the set temperature is 72° F. and the interior temperature is 90° F., the system control unit 12 would activate the compressor and initiate high fan speed operation to speed cooling. Conversely, given the same set temperature of 72° F. and mode of operation, if the interior temperature is 75° F., a low fan speed output would be appropriate. When in automatic climate temperature control mode operating in conjunction with manual fan speed selection, however, the system control unit adopts the user-selected fan speed and reaches/maintains the set temperature through automated control of only compressor clutch engagement.

The external temperature sensor 148 is used to detect when a threshold outside temperature has been reached, such as 34° F. At this temperature or below, the input from the external temperature sensor causes the system control unit to de-energize the compressor and condenser outputs.

An additional sensor that may be included to provide input to the enhanced relay board is the freezstat sensor switch 150 which opens when icing is detected on the evaporator coil. Opening of the freezstat switch 150 causes the ECC system 10 to turn off the compressor and condenser outputs of the system control unit 12, display "Fr" 110*c* or other suitable code on the display 108 of the thermostat switch 100, set the fan speed to low, and disable the mode input surface 74 of the mode/fan speed switch 71 and the temperature setting input surfaces 104, 106 of the thermostat switch 100.

Further sensor inputs that can be incorporated include a compressor sensor 152 and fuse inputs 154. The compressor sensor, generally designated by the reference numerals 152 and 153, includes a microprocessor 156, 157 that monitors voltage to the compressor 18, and is shown in FIGS. 2 and 3; respectively. When the voltage is too low, the system control unit 12 turns the compressor off. A compressor clutch cycle fault can also be generated when the system control unit 12 determines that the compressor 18 has cycled on and off too many times in a given time period; such a fault also triggers the system control unit 12 to shut down the compressor 18.

The functionality that determines when a compressor clutch cycle fault has occurred is obtained through appropriate programming of the microprocessor 156, 157.

When the ECC system is embodied with the thermostat switch 100, the voltage and compressor clutch cycle faults are indicated on the display 108 with a "Co" 110*d* or other suitable code, providing diagnostic input to the user/driver. Alternatively, the system can be programmed to provide two different display codes so as to differentiate the compressor-related problems, such as "LV" for low voltage and "CF" for compressor clutch cycle fault. Finally, the fuse input 154 monitors the fuses and prompts display of "FS" 110*e* or other suitable code on the user control unit display when a fuse has been blown.

In addition to the dynamic diagnostic capabilities using the various sensor inputs as just described to provide input to the user/driver during system operation, the ECC system according to the present invention further supports more comprehensive diagnostic capability during maintenance procedures through the inclusion of a computer interface port 158 built into the system control unit 12 for connection to a computer 160, as shown in FIG. 15. These diagnostic tools provide valuable fault history for advanced troubleshooting and also enable system enhancements to be performed by uploading new firmware using the computer 160.

Figure 16:
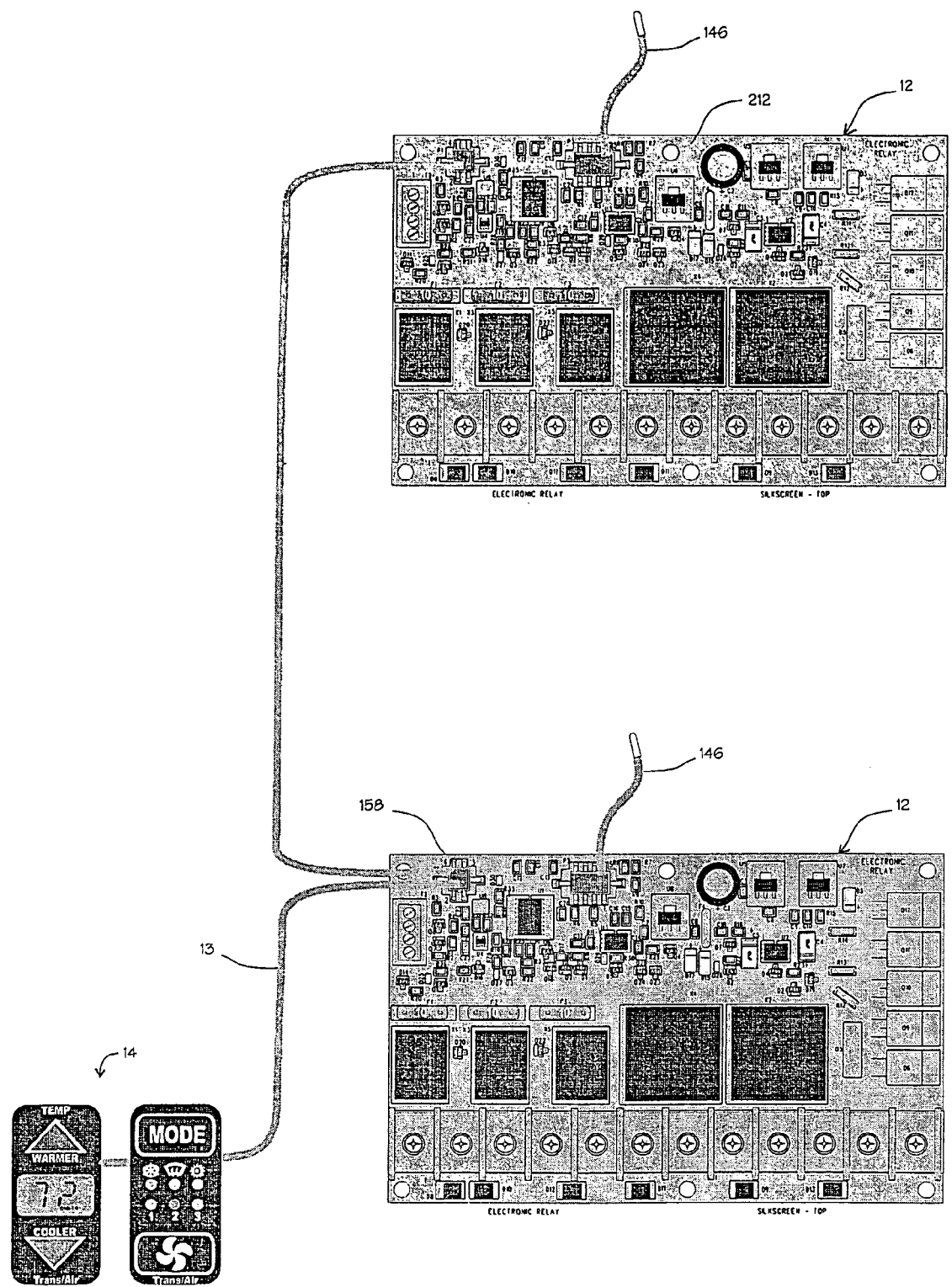
FIG. 16 is an illustration of the expanded user control unit of FIG. 6 as used in conjunction with multiple system control units in accordance with the present invention.

The ECC system can be configured to include an additional system control unit 212, as shown in FIG. 16. This configuration is desirable when the system is implemented on a very large vehicle that requires or could benefit from two evaporator units, one in the front and one in the rear of the cabin, to maintain the desired temperature conditions on board.

To accommodate this configuration, the system control unit 12 can be configured to function as either a master unit or a slave unit. When only one system control unit 12 is used, that unit functions as a master system control unit. When two such units 12, 212 are used as in FIG. 16, they are serially connected so that the first unit acts as the master system control unit 12 while the second unit acts as the slave system control unit 212. The slave unit 212 does not have sensor inputs but is controlled by the user control unit 14 and sensor inputs to the master system control unit 12. Thus, there is only one temperature control input and the slave system control unit 212 mimics the outputs of the master unit 12. However, an algorithm within the master system control unit may be used to control the fan output of the-two evaporator units in order to optimize the mix and thus obtain the desired set temperature.

The programmability of the system control unit in conjunction with the highly integrated switches that constitute the user control unit result in a climate control system having broad functionality that can be installed on a wide range of vehicle platforms as a stand-alone system or adapted to integrate with the existing HVAC systems on such platforms. Through the development of switches that are accommodated within the space of standard bus control panel switch blank and which have clearly discernible control surfaces, the present invention provides for ease of installation and use while, at the same time, representing the compact integration of multiple functions in a manner not possible in the prior art. The resulting benefit to the high-occupancy passenger vehicle industry realized from the foregoing ECC system is therefore significant.

The foregoing descriptions and drawings should be considered as illustrative only of the principles of the invention. The invention may be configured in a variety of ways and is not limited by the specific circuitry of the preferred embodiment. Numerous applications of the present invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

What is claimed is:

1. An electronic climate control (ECC) system for controlling a compressor, a condenser and an evaporator within a vehicle, comprising:
   a system control unit having a plurality of power connections and a plurality of signal connections, said power connections including output terminals to the compressor, the condenser and the evaporator; and
   a user control unit electrically coupled to said system control unit and including a mode/fan speed switch having a mode/fan speed interface panel for receiving input from a user, said mode/fan speed switch sized to substantially correspond to cutout dimensions of a standard rocker switch blank, said user inputs being transmitted to said system control unit via said plurality of signal connections.

2. The ECC system as set forth in claim 1, wherein said mode/fan speed interface panel includes a touch pad having two input surfaces and a plurality of indicators for displaying a selected mode and activation level produced through pressure contact with at least one of said two input surfaces, said selected mode and activation level being transmitted as said user inputs to said system control unit.

3. The ECC system as set forth in claim 2, wherein said two input surfaces include an operating mode input and an activation level input, and said plurality of indicators include three mode indicators and three activation level indicators, said three mode indicators corresponding to heating mode, cooling mode and defrost mode selectable through repeated activation of said operating mode input, and said three activation level indicators indicating progressive fan speeds from low to high produced in series in response to repeated activation of said activation level input.

4. The ECC system as set forth in claim 3, wherein said indicators include light emitting diodes.

5. The ECC system as set forth in claim 1, further comprising a plurality of sensors coupled to said system control unit for monitoring a plurality of conditions relating to opperation of the HVAC system, said plurality of sensors including a return air temperature sensor.

6. The ECC system as set forth in claim 5, wherein said user control unit further includes a thermostat switch having a temperature input interface panel for receiving input from a user and sized to substantially correspond to the cutout dimensions of said standard rocker switch blank.

7. The ECC system as set forth in claim 6, wherein said temperature input interface panel includes a second touch pad having two input surfaces and a display for displaying the inside temperature or a set temperature produced through pressure contact with at least one of said two temperature input interface panel input surfaces, said set temperature being transmitted to said system control unit via said plurality of signal connections.

8. The ECC system as set forth in claim 7, wherein said display of said temperature input interface panel further displays fault/diagnostic codes in response to inputs received from said system control unit via said plurality of signal connections.

9. The ECC system as set forth in claim 8, wherein said mode/fan speed interface panel and said temperature input interface panel are arranged side by side in adjacent rocker switch blanks in the control panel of said bus, each rocker switch blank having a cutout area of about one inch by about two inches.

10. The ECC system as set forth in claim 1, wherein said standard rocker switch blank is approximately one inch in width and two inches in length.

11. The ECC system as set forth in claim 1, wherein said system control unit further includes a computer interface port for system monitoring and diagnostics.

12. The ECC system as set forth in claim 1, wherein said system includes a plurality of system control units connected in series, each of said plurality of system control units being controlled through said user control unit.

13. The ECC system as set forth in claim 1, wherein said mode/fan speed switch is mounted in a housing having breakaway portions such that said housing is adaptable, through retention or removal of said portions, to fit in rocker switch blanks of varying sizes.

14. A multi-function electronic switch module for controlling an HVAC system on a bus, said switch module comprising a mode/fan speed switch with a interface panel for receiving input from a driver, and a housing for retaining said switch therein which is adaptable to fit into standard rocker switch blanks of varying sizes within a control panel of said bus.

15. The multi-function electronic switch module as set forth in claim 14, wherein said mode/fan speed interface panel includes a touch pad having two input surfaces and a plurality of indicators for displaying a selected mode and activation level produced through pressure contact with at least one of said two input surfaces, said selected mode and activation level being transmitted to a corresponding system control unit on said bus to effect corresponding activation of the HVAC system.

16. The multi-function electronic switch module as set forth in claim 15, wherein said two input surfaces include an operating mode input and an activation level input, and said plurality of indicators include three mode indicators and three activation level indicators, said three mode indicators corresponding to heating mode, cooling mode and defrost mode selectable through repeated activation of said operating mode input, and said three activation level indicators indicating progressive fan speeds from low to high produced in series in response to repeated activation of said activation level input.

17. The multi-function electronic switch module as set forth in claim 16, further comprising a second switch having a temperature input interface panel for receiving input from the driver, and a housing for retaining said second switch therein which is adapted to fit into standard rocker switch blanks of varying sizes within a control panel of said bus.

18. The multi-function electronic switch module as set forth in claim 17, wherein said temperature input interface panel includes a second touch pad having two input surfaces and a display for displaying an inside temperature of the bus, a set temperature produced through pressure contact with at least one of said two temperature input interface panel input surfaces, or one of a plurality of fault/diagnostic codes in response to inputs received from the system control unit of said HVAC system.

19. The multi-function electronic switch module as set forth in claim 16, wherein said mode/fan speed interface panel and said temperature input interface panel are arranged side by side in adjacent rocker switch blanks in the control panel of said bus, each rocker switch blank having a cutout area of about one inch by about two inches.

20. The multi-function electronic switch module as set forth in claim 19, wherein said housing further includes a pair of spring arms on opposing sides thereof, said spring arms flexing inwardly during installation of said switch module and then springing back outwardly to secure said switch module within said bus control panel.

21. The multi-function electronic switch module as set forth in claim 14, wherein said housing includes breakaway tabs that can be retained or removed as needed to provide said adaptability for fitting within rocker switch blanks of varying sizes.

* * * * *